(12) United States Patent
Borgen et al.

(10) Patent No.: US 8,729,721 B2
(45) Date of Patent: May 20, 2014

(54) WIND TURBINE ROTOR AND WIND TURBINE

(75) Inventors: Eystein Borgen, Radal (NO); William Scott Carron, Radal (NO); Mark Johnson West, Hjellestad (NO)

(73) Assignee: Sway Turbine AS (NO)

(*) Notice: Subject to any disclaimer, the term of this patent is extended or adjusted under 35 U.S.C. 154(b) by 187 days.

(21) Appl. No.: 13/123,263

(22) PCT Filed: Oct. 9, 2009

(86) PCT No.: PCT/EP2009/063174
§ 371 (c)(1),
(2), (4) Date: Apr. 8, 2011

(87) PCT Pub. No.: WO2010/040829
PCT Pub. Date: Apr. 15, 2010

(65) Prior Publication Data
US 2011/0193349 A1    Aug. 11, 2011

(30) Foreign Application Priority Data
Oct. 10, 2008  (GB) .................................. 0818610.8

(51) Int. Cl.
*F03D 9/00* (2006.01)
*H02P 9/04* (2006.01)

(52) U.S. Cl.
USPC .............................................. 290/44; 290/55

(58) Field of Classification Search
CPC ................................... F03D 1/06; F03D 11/00
USPC ........... 290/44, 55; 416/204 R, 204 A, 244 R, 416/244 A, 174, 131, 132 B, 134 R, 210 R, 416/210 A, 211
See application file for complete search history.

(56) References Cited

U.S. PATENT DOCUMENTS

| | | | |
|---|---|---|---|
| 2,050,129 A | 8/1936 | Scholes | |
| 4,330,714 A | 5/1982 | Smith | |
| 4,350,895 A | 9/1982 | Cook | |
| 5,118,255 A | 6/1992 | Moreno | |
| 6,285,090 B1 | 9/2001 | Brutsaert et al. | |
| 6,951,443 B1 | 10/2005 | Blakemore | |
| 7,042,109 B2 * | 5/2006 | Gabrys | ........................... 290/44 |

(Continued)

FOREIGN PATENT DOCUMENTS

| | | |
|---|---|---|
| CA | 2626545 | 5/2007 |
| DE | 19606359 | 8/1997 |

(Continued)

OTHER PUBLICATIONS

PCT, International Search Report and Written Opinion, International Application No. PCT/EP2009/063174 (Aug. 3, 2010).

*Primary Examiner* — Tulsidas C Patel
*Assistant Examiner* — Thomas Quigley
(74) *Attorney, Agent, or Firm* — Thompson Hine L.L.P.

(57) ABSTRACT

A wind turbine comprises a tower provided at the top with a horizontal shaft having an axis. A turbine rotor comprises turbine blades connected by a mounting arrangement to bearing members and to a rotor or a generator. Components of forces acting on the blades parallel to the axis are substantially exclusively communicated to the bearing members, for example by rigid straight members. Torque about the axis produced by the blades is communicated substantially exclusively to the rotor through a member.

20 Claims, 7 Drawing Sheets

(56) References Cited

U.S. PATENT DOCUMENTS

| | | |
|---|---|---|
| 2005/0200134 A1 | 9/2005 | Shibata et al. |
| 2006/0251516 A1 * | 11/2006 | Sohn ................. 416/132 B |
| 2008/0124216 A1 | 5/2008 | Liao |
| 2008/0253892 A1 * | 10/2008 | Dehlsen ................. 416/147 |

FOREIGN PATENT DOCUMENTS

| | | |
|---|---|---|
| DE | 10255745 | 6/2004 |
| DE | 10311025 | 9/2004 |
| EP | 0058791 | 9/1982 |
| EP | 1394406 | 3/2004 |
| EP | 1509696 | 3/2005 |
| EP | 1657437 | 5/2006 |
| EP | 1944504 | 7/2008 |
| GB | 1511948 | 5/1978 |
| WO | 86/02701 | 5/1986 |
| WO | 97/13979 | 4/1997 |
| WO | 02/099950 | 12/2002 |
| WO | WO 02099950 * | 12/2002 |
| WO | 03/098034 | 11/2003 |
| WO | 03/098038 | 11/2003 |
| WO | 2007/043894 | 4/2007 |
| WO | WO 2007043894 * | 4/2007 |
| WO | 2007/135391 | 11/2007 |
| WO | 2008/127114 | 10/2008 |

\* cited by examiner

WIND TURBINE ROTOR AND WIND TURBINE

The present invention relates to a wind turbine rotor and to a wind turbine including such a rotor.

BACKGROUND

Wind turbines for generating electricity are known and are being deployed in increasing numbers to provide a sustainable electricity supply. The maximum power which a wind turbine can generate is proportional to the swept area of its blades, which swept area is approximately proportional to the square of the lengths of the blades. There is a desire to increase the size of wind turbines so as to increase the maximum power which they are capable of providing and so as to reduce the cost of the supplied energy. However, linear scaling of output power cannot be achieved simply by linearly scaling the wind turbine components.

For example, if the length of each blade is doubled, the swept area is increased four-fold. However, the weight of each blade is generally proportional to the cube of the length so that the weight is increased eight-fold.

Wind turbines are known in which blades are fixed to a hub which drives a generator via a shaft connected to that hub. Examples of this arrangement are disclosed in WO 03/098034A1, DE 10311025A1, US 2006/0251516A1, EP 0058791A1 and U.S. Pat. No. 6,951,443B1.

Generators driven by axles have typically required the use of a gearbox to increase the rotary speed so as to provide more efficient generation of electricity. However, gearboxes are inconvenient in that they add to the cost, weight and servicing requirements of wind turbines. Direct drive generators have been used and examples of such arrangements are disclosed in DE 10255745A1 and U.S. Pat. No. 6,285,090B1.

WO 02/099950A1 discloses an electrical generator of this type. The wind turbine comprises a rotor whose rim is connected to a hub by tension members so as to resemble a spoked bicycle wheel. The hub is driven by an axially spaced wind turbine blade arrangement.

CA26265452A1 discloses a wind turbine with a direct drive generator. The blades of the turbine rotor are fixed to an annulus, which is connected to a hub by rods extending radially from the hub and disposed in a common plane perpendicular to the axis of rotation. The blade forces are resolved at the annulus, to which the inner ends of the blades are connected. The annulus must therefore be fabricated with sufficient strength to withstand these forces. For an annulus having a radius about the axis of rotation of the order of 12 meters and a cross-sectional diameter of the order of 3.5 meters, manufacture is relatively expensive and the annulus is of considerable weight. Transportation and assembly of the wind turbine therefore tend to be expensive.

U.S. Pat. No. 7,042,109B2 discloses various arrangements of wind turbines in which a turbine rotor drives an ironless ring-type generator directly or through a gearbox. In the arrangement shown in FIG. 3 of this document, the blades extend within a rotor hub to the hub bearings and a generator rotor is fixed to the hub. Components parallel to the axis of rotation of forces acting on the blades are communicated to the bearings and also to the generator rotor. Torque produced by the blades is transmitted to the generator rotor.

Wind turbines with the blades fixed to a hub and braced by a rope or cable arrangement are also known. In such turbines, the hub again drives a generator via an axle and typically via a gearbox. Wind turbines of this type are not suitable for relatively high power generation as the swept area cannot be increased sufficiently while maintaining the integrity of structure.

Other examples of wind turbines are disclosed in GB 1511948A1, WO 97/13979A1, U.S. Pat. No. 4,330,714A, U.S. Pat. No. 4,350,895A, WO 86/02701A1, WO 2007/135391A2, US 2005/200134A1, U.S. Pat. No. 5,118,255A, U.S. Pat. No. 2,050,129A, DE 19606359A1 and US 2008/124216A1.

SUMMARY

According to a first aspect of the invention, there is provided a wind turbine rotor comprising at least one bearing member for permitting rotation of the rotor with respect to a shaft about an axis, a generator drive arrangement and a plurality of turbine blades and blade mounting arrangements, the blades being unsupported at their radially outer ends, each blade mounting arrangement being arranged to communicate components, acting parallel to the axis, of all forces acting on the associated blade substantially exclusively to the at least one bearing member and to communicate torque acting about the axis on the associated blade substantially exclusively to the generator drive arrangement, the generator drive arrangement being connected to but separate from the blades.

Each blade mounting arrangement may comprise a first open frame structure. The first open frame structure may comprise a first space frame.

The generator drive arrangement may be connected to the at least one bearing member by a second open frame structure. The second open frame structure may be mechanically substantially independent of the first open frame structure. The second open frame structure may comprise at least one second space frame.

The radial distance from the axis to the radially innermost end of each blade may be greater than the radial distance from the axis to the generator drive arrangement.

The turbine blades and blade-mounting arrangements may be spaced equi-angularly around the axis. The turbine blades may be disposed in a first plane which is perpendicularly to the axis or in a frusto-conical surface which is coaxial with the axis. The blade mounting arrangements may be separate from each other.

Each blade mounting arrangement may be connected to the generator drive arrangement by a first member for transmitting substantially only torque about the axis from the associated blade to the generator drive arrangement. The first member may be resilient, and/or may be articulated to the blade mounting arrangement and the generator drive arrangement, so as substantially to prevent the communication of components, acting parallel to the axis, of all forces acting on the blade to the generator drive arrangement.

Each blade mounting arrangement may comprise second and third members disposed in a second plane containing the axis and having first ends connected together and to the blade and second ends connected to the at least one bearing member at respective positions which are spaced apart parallel to the axis. Each blade may have a centre of force and the second and third members may extend in lines which intersect each other at or adjacent the centre of force. The second and third members of each blade mounting arrangement may comprise first and second portions of a composite member.

Each blade mounting arrangement may be shaped so as to convert wind into torque about the axis.

Each blade mounting arrangement may comprise first and second attachment points attached to the at least one bearing member and a third attachment point attached or connected to the generator drive arrangement.

The blade mounting arrangement may have resilience at or adjacent the third attachment point for substantially preventing the communication of components, acting parallel to the axis, of all forces acting on the blade to the generator drive arrangement.

The generator drive arrangement may be connected to the at least one bearing member by a plurality of pairs of fourth and fifth members disposed in respective third planes containing the axis and having first ends connected together and to the generator drive arrangement and second ends connected to the at least one bearing member at respective positions which are spaced apart parallel to the axis.

Each of the members may be substantially rigid.

Each of the members may be substantially straight, or may have a substantially straight portion, between the first and second ends thereof.

The at least one bearing member may comprise first and second bearing members which are spaced apart axially to accommodate a generator stator. The first and second bearing members may form part of or may cooperate with a thrust bearing arrangement for determining or restricting the axial separation of the first and second bearing members. The first and second bearing members may be connected to the second ends of the second and third members, respectively, and for the second ends of the fourth and fifth members, respectively.

The generator drive arrangement may be annular and coaxial with axis.

The generator drive arrangement may be fixed to or may form at least part of a generator rotor. The generator rotor may comprise a plurality of permanent magnets or coils angularly spaced around the axis. The generator rotor may comprise first and second coaxial annular yokes which face each other across a magnetic air gap for a or the generator stator. The first ends of the fourth and fifth members may be fixed to the first and second yokes. The first and second yokes may be ferromagnetic. The permanent magnets may be fixed to backing plates which are detachably attached to facing surfaces of the first and second yokes to define the air gap.

According to a second aspect of the invention, there is provided a wind turbine rotor comprising a hub for rotation about an axis and at least one turbine blade and blade mounting arrangement, the or each blade having a centre of force for all force components acting parallel to the axis and the or each blade mounting arrangement comprising first and second members which connect the associated blade to the hub, which are connected to the hub at radially inner ends spaced apart parallel to the axis, and which extend in lines which substantially intersect each other substantially at or adjacent the centre of force.

According to a third aspect of the invention, there is provided a wind turbine comprising a rotor according to the first or second aspect of the invention and a generator.

The generator may be arranged to be driven by or may include the drive arrangement.

The generator may be a direct drive generator.

The generator may be an ironless generator.

The bearing members may be rotably mounted on a fixed shaft to which the stator is rotational fixed.

It is thus possible to provide a wind turbine rotor and to make wind turbine which is capable of generating a relatively large amount of electrical power. Such an arrangement may be made relatively light and may be relatively easy to manufacture, transport and assemble. Such arrangement may also be capable of providing relatively low cost energy, for example in terms of the electrical energy which may be generating throughout the life of a wind turbine compared with manufacturing and running costs.

BRIEF DESCRIPTION OF THE DRAWINGS

The invention will be further described, by way of example, with reference to the accompanying drawings, in which.

Like reference numerals refer to like parts throughout the drawings.

DETAILED DESCRIPTION

Figure 1:
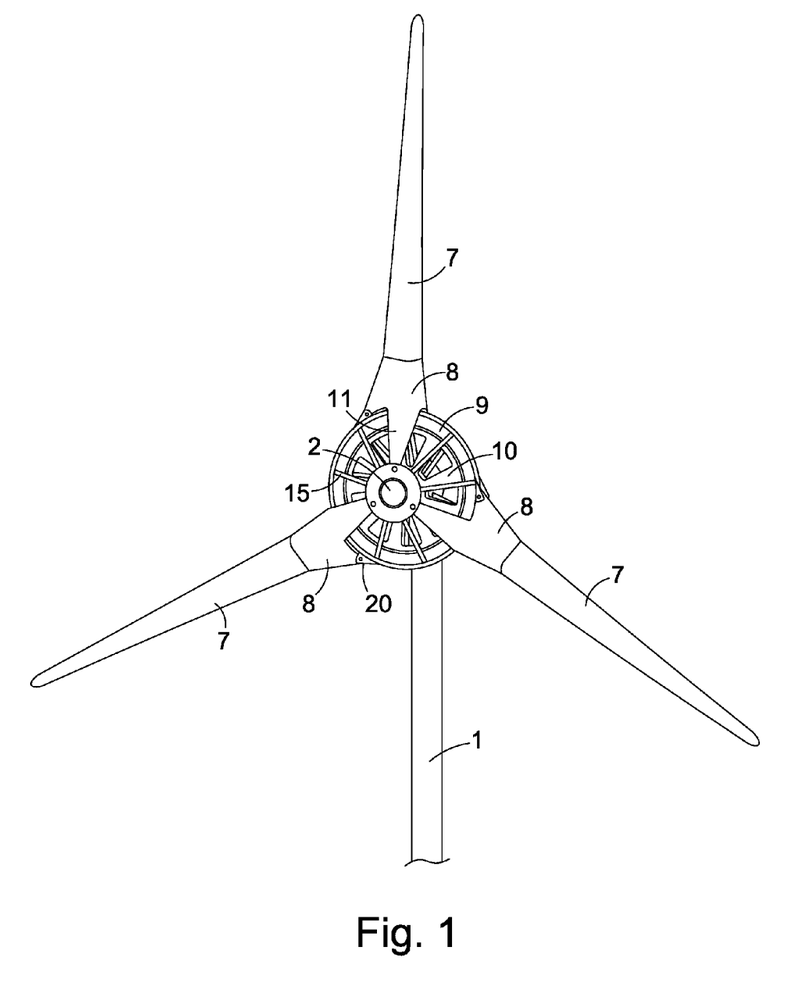
FIG. 1 illustrates a wind turbine constituting an embodiment of the invention.
Figure 2:
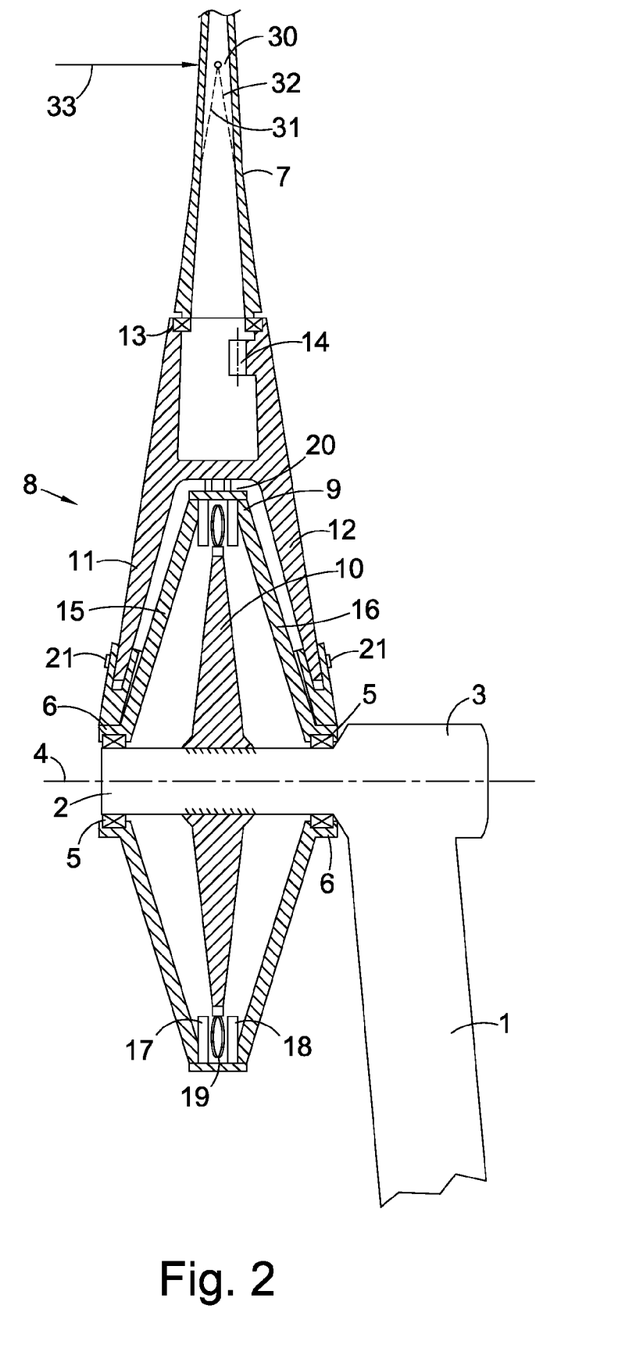
FIG. 2 is a cross-sectional drawing of part of the wind turbine of FIG. 1.

The wind turbine shown in FIGS. 1 and 2 is suitable for use as a high power generator of electricity. For example, in a typical application, such a wind turbine may have a rated output of the order of twelve MegaWatts. The turbine may be deployed on land or offshore wherever favourable wind conditions exist and the presence of one or more such wind turbines is acceptable.

The wind turbine comprises a support tower 1 which may be fixed in the ground by means of a suitable foundation (not shown) for onshore applications or may be provided with buoyancy and/or fixing arrangements for offshore applications. For example, the tower and fixing arrangement may be of the type disclosed in EP1509696 and EP1944504.

A main shaft 2 is fixed to a head 3 of the tower 1 such that an axis 4 of the shaft is maintained substantially horizontal. In order to allow the wind turbine to accommodate different wind directions, the head 3 may be mounted at the top of the tower 1 for pivoting about a vertical axis. The wind turbine comprises a rotor which is rotatably mounted on the shaft 2 for rotation about the axis 4 by means of main bearings 5 including first and second bearing members 6. The rotor comprises the bearing members 6 (constituting a hub), three turbine blades 7 which are arranged equi-angularly around the axis 4, three turbine blade mounting arrangements 8, and a generator drive arrangement in the form of an annular generator rotor 9. A generator stator 10 is fixed to the shaft 2 between the bearing members 6.

Although the wind turbines of the embodiments described herein have three turbine blades and mounting arrangements, any appropriate number of blades and mounting arrangements may be provided according to the application. The blades 7 are supported exclusively at their radially inner ends or portions and are unsupported at their radially outer ends.

Each mounting arrangement 8 comprises a member which may be formed from composite material or from metal. The arrangement 8 resembles an "A-frame" or space frame and comprises first and second portions 11 and 12 forming first and second members whose inner ends are connected to the bearing members 6 so as to be spaced apart parallel to the axis 4. The outer ends are connected together and to an outer part of the composite member 8 which provides a pivotal mounting for the blade 7 such that the blade 7 may be pivoted about its longitudinal axis so as to permit the degree of feathering or pitch of the blade to be controlled. The mounting comprises a bearing 13 for permitting the pitch of the blade 7 to vary and a motor 14 for rotating the blade 7 to a desired pitch. The outer ends of the members 11 and 12 are connected to the mounting for the blade 7 by virtue of being part of the composite member.

The rotor comprises a plurality of pairs of third and fourth members 15 and 16 arranged to resemble A-frames or space frames. The radially inner ends of the members 15 and 16 are connected to the bearing members 6 so as to be spaced apart axially whereas the radially outer ends of the members 15 and 16 are connected to a generator drive arrangement in the form of the generator rotor 9. The generator drive arrangement is thus connected to but separate from the blades 7.

The generator comprising the rotor 9 and the stator 10 is of the ironless, annular or ring, direct drive type. The rotor comprises a pair of coaxial annular members 17 and 18 carrying permanent magnets and defining therebetween a magnetic air gap. The magnets are arranged on the annular members 17 and 18 as facing pairs of magnets such that the magnets of each pair have opposite poles facing each other and the magnet poles alternate around the circumferences, or angularly with respect to the axis 4.

The stator comprises a plurality of angularly distributed coils 19 which are disposed inside the air gap between the members 17 and 18. The coils 19 are of the "ironless" type in that they do not contain a ferromagnetic core. For example, the coils may be formed and encapsulated in a material of sufficient strength, such as an epoxy resin, to maintain the structure and form of the coils. The outputs of the coils are processed in accordance with the specific requirements of the application and the generated electricity is supplied via conductors passing through the tower 1.

Generators of this type are known and will not be further described in detail. Similarly, electrical circuit arrangements for processing the outputs of such generators are known and will not be further described. Examples of such generators and arrangements are, for example, disclosed in several of the publications referred to hereinbefore.

Each of the mounting arrangements 8 is connected to the rotor 9 by means of a connection shown at 20. The rotor 9 is thus driven by each blade 7 via its mounting arrangement 8 and the connection 20 so as to rotate about the axis 4 relative to the stator 10. The coils 19 thus cut the magnetic flux between the members 17 and 18 in the air gap to generate electricity.

In use, the blades 7, which are disposed in a common plane perpendicular to the axis 4 of rotation about the shaft 2 or in a frusto-conical surface which is coaxial with the axis 4, are directed into the wind direction and the motors 14 rotate the blades 7 around their longitudinal axes so as to provide the desired blade pitch. For example, the pitch may be set such that the outer tip speed of the blades 7 is approximately equal to six times the wind speed for maximum theoretical efficiency of energy extraction from the wind. Various forces act on the blades 7 and these may be resolved into forces acting on the blades 7 parallel to the axis 4 and into torque acting on the blades 7 about the axis 4. The mounting arrangement 8 is such that the forces acting parallel to the axis 4 (or all components of forces acting parallel to this axis) are substantially exclusively communicated, principally by the members 11 and 12 of each composite member 8, to the bearing members 6. Each blade 7 has a centre 30 of force for all force components 33 acting parallel to the axis 4 of rotation. The members 11 and 12 extend in lines 31, 32 which substantially intersect each other at or adjacent the centre 30 of force. Thus, any tendency to movement in the horizontal direction in FIG. 2 is resisted by the bearing members 6 via the members 11 and 12 and is not substantially communicated via the connection 20 to the rotor 9.

Similarly, the torque generated by the blades 7 is communicated substantially exclusively via the connection 20 to the generator rotor 9. The members 15 and 16 supporting the rotor 9 on the bearing member 6 do not carrying any substantial load or component of force parallel to the axis 4 and so are merely required to ensure structural stability of the rotor 9 in directions parallel to the axis 4. All of the load-bearing members are acting in substantially tension or compression and thus resemble a space frame arrangement. An open framework structure resembling or acting as a space frame may therefore be used to form the turbine rotor arrangement for mounting the turbine blades and driving the generator. A relatively light structure may therefore be provided and is easily capable of maintaining structural integrity in the presence of forces occurring during the operation of a relatively high power wind turbine. For example, such a structure may be used to provide a relatively light 12 MW or similar size generator.

Because the torque generated by the blades 7 about the axis 4 is communicated substantially exclusively by the connection 20 on each member 8, the connection 20 may be of a pivotal type. Similarly, the connections 21 of the members 11 and 12 to the bearing members 6 are not required to communicate or resist torque because the rigid substantially straight members 11 and 12 are substantially only transmitting tension and compression forces along their lengths. Only relatively minimal forces in the plane of FIG. 2 parallel to the axis 4 act on the rotor 9 so that the air gap between the annular permanent magnet carrying members 17 and 18 may be relatively small.

In the case of a wind turbine with a maximum generating capacity of the order of 12 MW, the blades 7 are typically of the order of 50 m in length and the rotor 9 is typically of the order of 12 m radius. The open frame structure provides adequate structural integrity by means of a relatively light structure forming or resembling a space frame. Manufacture of components, transportation to site, and assembly of the components to form the wind turbine are therefore easier and cheaper than for known types of arrangements. It is therefore possible to provide a wind turbine which is less expensive to manufacture and assemble and which requires relatively little servicing in use. Such a wind turbine therefore provides a very good ratio of generated energy to total cost throughout its lifetime and represents a sustainable source of electrical energy which is very efficient in terms of manufacturing and running costs.

By providing the permanent magnets of the generator on the rotor 9 and the coils 19 of the generator on the stator 16, the generated electricity may be extracted from the wind turbine by means of fixed electrical conductors without requiring, for example, slip-rings or other relatively moveable electrical connections. However, if necessary or desirable, the permanent magnets may be provided on the stator 10 and the coils may be provided on the rotor 9, in which case some form of rotating electrical connection, such as slip-rings, will generally be necessary in order to extract the generated electricity from the wind turbine.

The generator rotor 9 forms part of the structure of the wind turbine rotor. It therefore serves the dual purpose of mounting the permanent magnets (or coils) of the generator and forming part of the structure for transmitting the torque generated by the blades 7. This represents a structurally efficient arrangement which contributes to the relative lightness of the turbine rotor and generator assembly.

Figure 3:
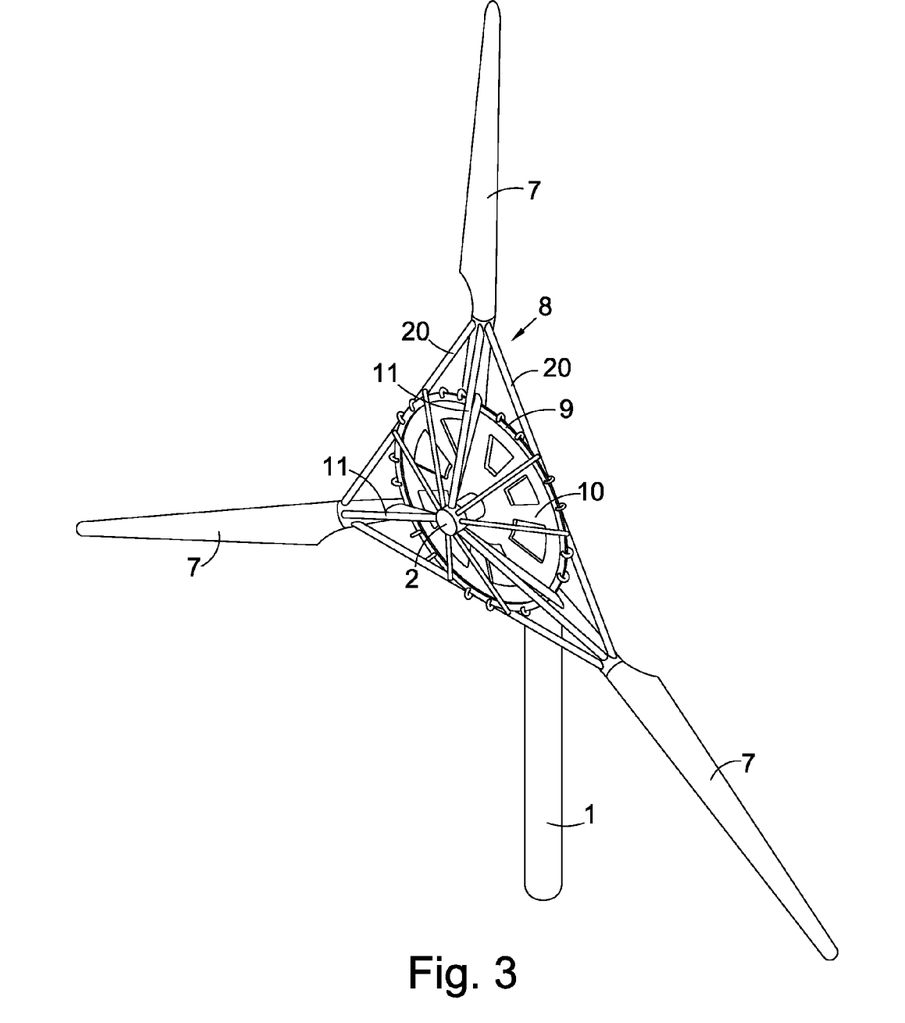
FIG. 3 illustrates a wind turbine constituting another embodiment of the invention.
Figure 4:
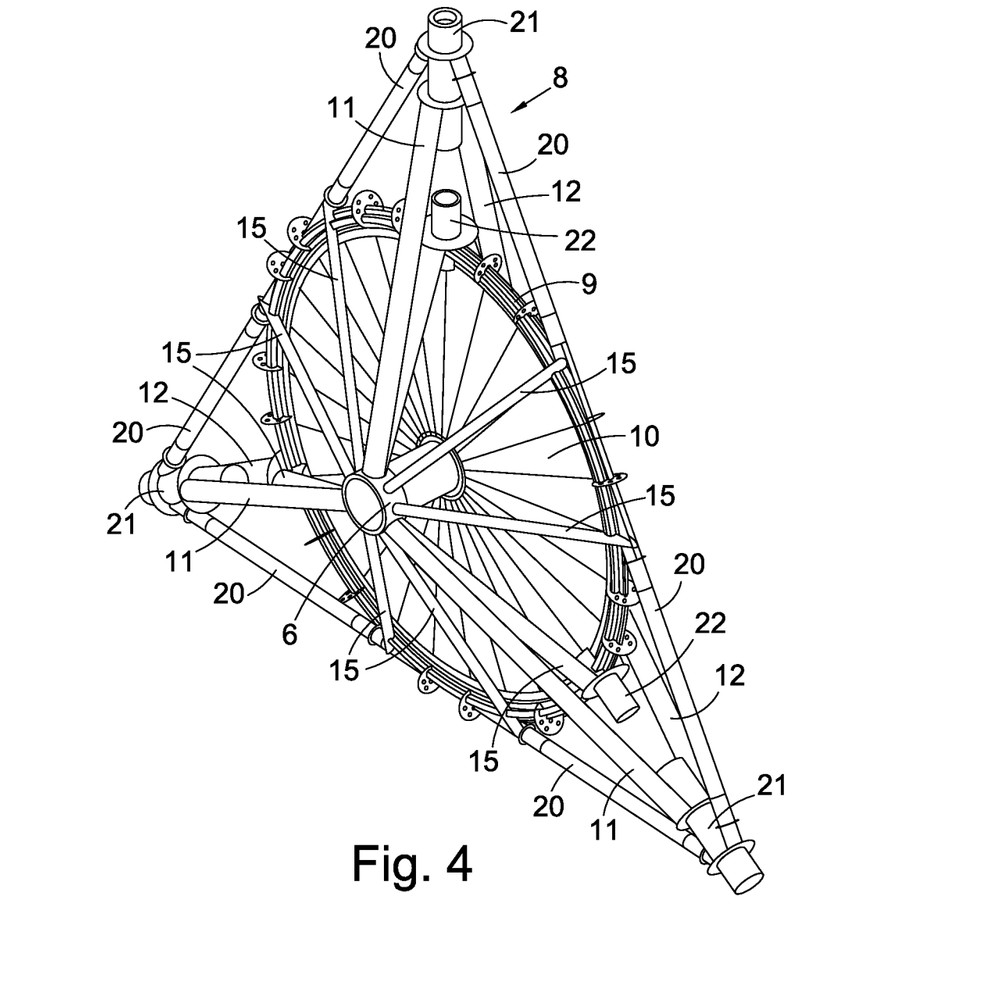
FIG. 4 illustrates a wind turbine rotor and stator of the turbine of FIG. 3 in more detail.

FIGS. 3 and 4 illustrate another type of wind turbine rotor which differs from that shown in FIGS. 1 and 2 principally in that the members 11 and 12 are formed as rods or tubes, for example of metal. Also, the connections 20 for transmitting torque from the blades 7 to the rotor 9 are formed as rods or tubes so that the structure including the blade mounting arrangements 8 more closely resembles a space frame. Each blade has its inward end mounted in a main bearing 21 such that components of forces acting on the blades parallel to the axis 4 of the shaft 2 are communicated substantially exclusively to the bearing members 6 via the members 11 and 12 (the members extend in lines which substantially intersect each other at or adjacent the centre of force of the blade for all force components acting parallel to the axis of rotation) whereas torque acting on the blades 7 about the axis 4 is communicated substantially exclusively by the members 20 to the rotor 9. The innermost ends of the blades are provided with or formed into a shaft which passes through the main bearings 21 to further bearings 22 which are fixed to the outer ends of those members 15 and 16 (not visible in FIGS. 3 and 4) which are located in the same radial plane containing the adjacent members 11 and 12. The members 15 and 16 therefore assist in communicating components, parallel to the axis 4, of force acting on the blades 7 to the bearing members 6 and do not transmit any substantial torque about the axis 4. The blades 7 and the rotor 9 are thus connected together and to the bearing members 6 by a space frame or an arrangement resembling a space frame. The rotor 9 also serves the purposes of acting as a structural member in respect of torque, resisting blade forces perpendicular to the axis of rotation, and supporting the permanent magnets (or coils) of the generators. The stator 10 is fixed to the shaft 2 between the bearing members 6, which form part of or are provided with thrust bearings for fixing or limiting the axial separation of the bearing members 6.

Figure 5:
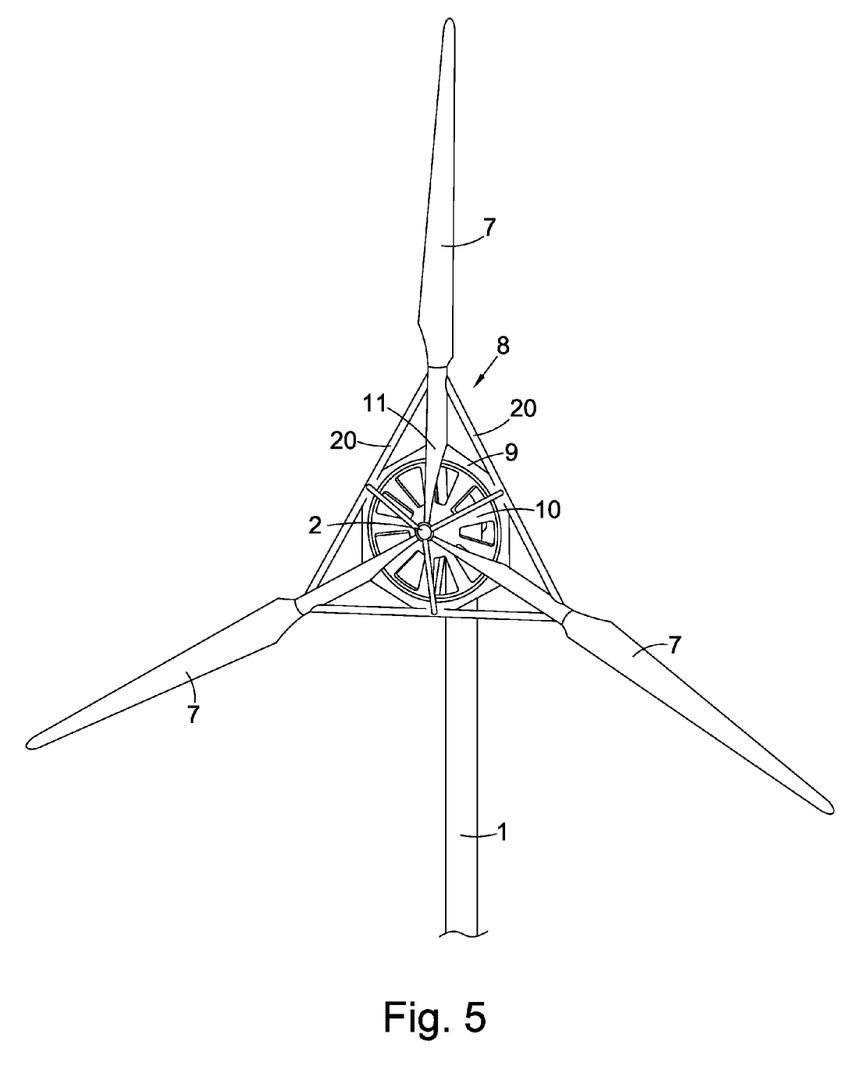
FIG. 5 illustrates a wind turbine constituting a further embodiment of the invention.
Figure 6:
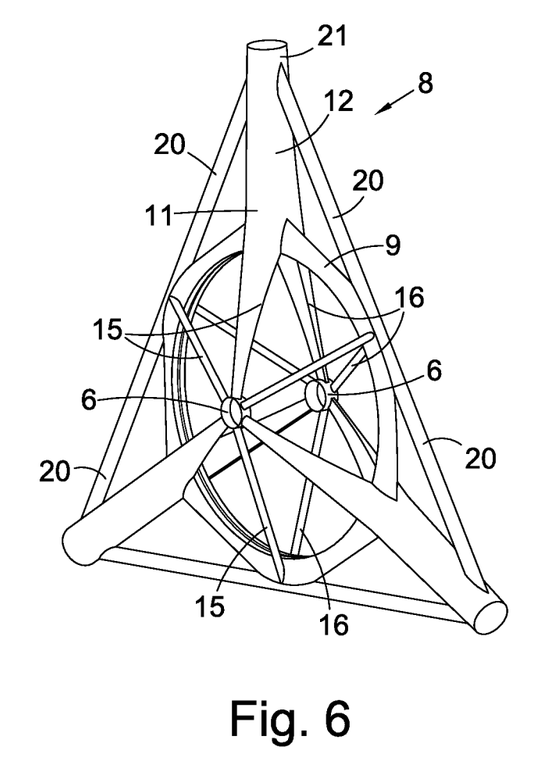
FIG. 6 illustrates a wind turbine rotor of the wind turbine of FIG. 5 in more detail.

The wind turbine rotor shown in FIG. 6 of the wind turbine shown in FIG. 5 is similar to the wind turbine rotor shown in FIG. 4 but is arranged to be fabricated as composite material sections which are bonded together. Each member 11 or 12 and its adjacent member 15 or 16 is formed integrally with the main blade bearing 21 and the auxiliary blade bearing 22. The whole of the wind turbine rotor may be formed of bonded composite components or may include some non-composite components. This rotor may therefore be considered as a composite equivalent of a space frame.

Figure 7:
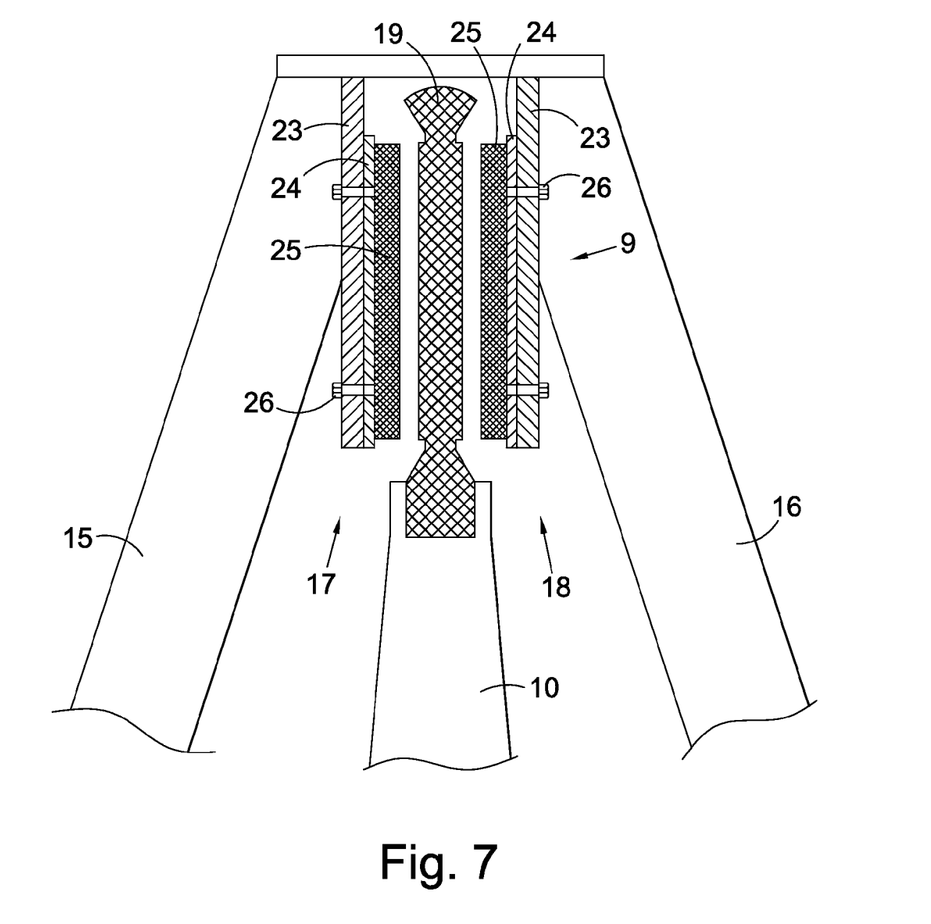
FIG. 7 is a cross-sectional drawing of a detail of the wind turbine part shown in FIG. 2.

FIG. 7 illustrates part of the generator rotor and stator structure which may be used in any of the embodiments but which, by way of example, relates to the rotor shown in FIG. 2. The generator rotor 9 comprises first and second annular yokes 23, which form a major structural part of the generator rotor. The yokes 23 also provide a magnetic flux path and therefore must be of a sufficient thickness for this purpose and of a suitable ferromagnetic material. The yokes 23 are fixed to the radially outer ends of the members 15 and 16.

In this embodiment, the permanent magnets 25 are fixed to the rotor 9. In particular, each of the permanent magnets 25 is of sector-like shape and is fixed to a ferromagnetic mounting plate 24. The mounting plates 24 are detachably fixed to the yokes 23, for example by means of bolts 26, so as to allow the magnets to be assembled to and dissembled from the yokes 23.

The stator 10 comprises a plurality of coils 19, for example "potted" in an epoxy resin so as to maintain the shape and structure of the coils against the forces acting within the generator and without the need for cores or formers. The coils 19 are disposed in the magnetic air gap defined between facing magnets 25 on the first and second yokes 23. The magnetic field in the air gap is substantially uniform so that generator performance is tolerant of the axial position of the coils 19 relative to the magnets 25. The magnets of each facing pair defining the air gap have opposite magnetic poles facing each other. Also, the magnetic poles of the permanent magnets on the yokes alternate circumferentially (or angularly about the axis 4). Each of the coils 19 thus generates an alternating current and the coils may be interconnected in accordance with any suitable, for example known, technique in order to provide the desired power output.

Advantage is taken of the need for the magnetic flux path behind the generally flat magnets to be of a certain minimum thickness for optimal generator performance. Much of this thickness is provided by the yokes 23, which are therefore relatively strong and form part of the structure of the generator rotor for the transmission of torque. Using separate mounting plates 24 for mounting the magnets 25 is convenient for the fabrication of the generator rotor 9 and for servicing, such as removal and replacement of damaged magnets.

Splitting of the generator rotor 9 into continuous annular yokes 23, which may be welded and/or machined prior to mounting of the magnets, and a plurality of discrete segments in the form of the plates 24 carrying the magnets 25 allows the magnets to be mounted during assembly of the rotor in smaller groups or segments. This is again convenient for assembly and for removal during use to replace damaged magnets or for any other purpose. Such an arrangement allows the mounting plates 24 and magnets 25 to be installed radially from outside the generator rotor structure without interfering with the end windings of the coils 19 which, as shown in FIG. 7, tend to be wider than the parts of the coils passing through the magnetic air gap. The stator 10 with the coils 19 is formed as a plurality of generally sector-shaped elements which are also installed radially during assembly of the turbine rotor. Each stator element is installed simultaneously with the adjacent magnets 25 on their mounting plates 24 so as to accommodate all of the components at the generator rim. This allows the main generator rim structure formed by the annular yokes 23 to be continuous.

What is claimed is:

1. A wind turbine rotor comprising at least one bearing member for permitting rotation of the rotor with respect to a shaft about an axis, a generator rotor and a plurality of turbine blades and blade mounting arrangements, the blade mounting arrangements defining a blade rotor which supports said blades, the generator rotor being connected to said blade rotor, and said generator rotor being located within said blade rotor;

wherein each blade mounting arrangement comprises first and second support members disposed in a plane containing said axis; and wherein said first and second support members have:
first ends which are connected together and also connected directly to a corresponding one of said blades; and
second ends which are connected to the at least one bearing member at respective positions which are spaced apart parallel to the axis.

2. A wind turbine rotor as claimed in claim 1, in which each blade mounting arrangement comprises a first open frame structure.

3. A wind turbine rotor as claimed in claim 1, in which the generator rotor is connected to the at least one bearing member by a second open frame structure.

4. A wind turbine rotor as claimed in claim 3, in which each blade mounting arrangement comprises a first open frame structure, and in which the second open frame structure is mechanically substantially independent of the first open frame structure.

5. A wind turbine rotor as claimed in claim 1, in which each blade mounting arrangement is connected to the generator rotor by a torque transmitting member for transmitting substantially only torque about the axis from the associated blade to the generator rotor.

6. A wind turbine rotor as claimed in claim 5, in which said torque transmitting member is resilient, and/or is articulated to the blade mounting arrangement and the generator rotor, so as substantially to prevent the communication of components, acting parallel to the axis, of all forces acting on the blade to the generator rotor.

7. A wind turbine rotor as claimed in claim 1, in which each blade has a center of force for all force components acting parallel to the axis and the first and second support members extend in lines which substantially intersect each other at or adjacent the center of force.

8. A wind turbine rotor as claimed in claim 1, in which each blade mounting arrangement comprises first and second attachment points attached to the at least one bearing member and a third attachment point attached or connected to the generator rotor.

9. A wind turbine rotor as claimed in claim 8, in which the blade mounting arrangement has resilience at or adjacent the third attachment point for substantially preventing the communication of components, acting parallel to the axis, of all forces acting on the blade to the generator rotor.

10. A wind turbine rotor as claimed in claim 1, in which the generator rotor is connected to the at least one bearing member by a plurality of pairs of third and fourth support members disposed in respective second planes containing the axis and having first ends connected together and to the generator rotor and second ends connected to the at least one bearing member at respective positions which are spaced apart parallel to the axis.

11. A wind turbine rotor as claimed in claim 1, in which the at least one bearing member comprises first and second bearing members which are spaced apart axially to accommodate a generator stator.

12. A wind turbine rotor as claimed in claim 11, in which the first and second bearing members form part of or cooperate with a thrust bearing arrangement for determining or restricting the axial separation of the first and second bearing members.

13. A wind turbine rotor as claimed in claim 10, in which the at least one bearing member comprises first and second bearing members which are spaced apart axially to accommodate a generator stator, and in which the first and second bearing members are connected to the second ends of the first and second support members, respectively, and the second ends of the third and fourth support members, respectively.

14. A wind turbine rotor as claimed in claim 1, in which the generator rotor is annular and coaxial with the axis.

15. A wind turbine rotor as claimed in claim 1, in which the generator rotor comprises a plurality of permanent magnets or coils angularly spaced around the axis.

16. A wind turbine comprising:
a) a generator; and
b) a wind turbine rotor comprising at least one bearing member for permitting rotation of the rotor with respect to a shaft about an axis, a generator rotor and a plurality of turbine blades and blade mounting arrangements, the blade mounting arrangements defining a blade rotor which supports said blades, the generator rotor being connected to said blade rotor, and said generator rotor being located within said blade rotor;
wherein each blade mounting arrangement comprises first and second support members disposed in a plane containing said axis; and
wherein said first and second support members have:
first ends which are connected together and also connected directly to a corresponding one of said blades; and
second ends which are connected to the at least one bearing member at respective positions which are spaced apart parallel to the axis.

17. A wind turbine rotor as claimed in claim 1, wherein each blade mounting arrangement is arranged to communicate components, acting parallel to the axis, of all forces acting on the associated blade substantially exclusively to the at least one bearing member and to communicate torque acting about the axis on the associated blade substantially exclusively to the generator rotor.

18. A wind turbine rotor as claimed in claim 1, in which the blades are unsupported at their radially outer ends.

19. A wind turbine rotor comprising a hub for rotation about an axis and at least one turbine blade and blade mounting arrangement, the or each blade having a center of force for all force components acting parallel to the axis and the or each blade mounting arrangement comprising first and second members which connect the associated blade to the hub, which are connected to the hub at radially inner ends, spaced apart parallel to the axis, and which extend in lines which substantially intersect each other substantially at or adjacent the center of force.

20. A wind turbine rotor as claimed in claim 1, wherein said first and second support members are connected to said blades by means of a pitch bearing for permitting the pitch of the blades to vary.

* * * * *